(12) United States Patent
Niiyama

(10) Patent No.: US 11,373,072 B2
(45) Date of Patent: Jun. 28, 2022

(54) INFORMATION PROCESSING DEVICE AND INFORMATION PROCESSING METHOD FOR CORRECTING ORIENTATION OF IMAGES

(71) Applicant: SEIKO EPSON CORPORATION, Tokyo (JP)

(72) Inventor: Shinichiro Niiyama, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/191,871

(22) Filed: Mar. 4, 2021

(65) Prior Publication Data

US 2021/0279537 A1 Sep. 9, 2021

(30) Foreign Application Priority Data

Mar. 6, 2020 (JP) .............................. JP2020-038525

(51) Int. Cl.
*G06K 15/02* (2006.01)
*B41J 29/393* (2006.01)
*G06K 15/00* (2006.01)
*B41J 3/407* (2006.01)

(52) U.S. Cl.
CPC ........ *G06K 15/1885* (2013.01); *B41J 3/4075* (2013.01); *B41J 29/393* (2013.01); *G06K 15/002* (2013.01); *G06K 15/024* (2013.01); *G06K 15/1807* (2013.01)

(58) Field of Classification Search
CPC .................................................. G06K 15/1885
USPC ......................................................... 358/1.2
See application file for complete search history.

(56) References Cited

U.S. PATENT DOCUMENTS

2018/0015749 A1* 1/2018 Inoue ..................... B41J 3/4075
2021/0229465 A1* 7/2021 Miyajima .............. B41J 3/4075

FOREIGN PATENT DOCUMENTS

JP 2012088936 A 5/2012
WO 2012053407 A1 4/2012

* cited by examiner

*Primary Examiner* — Jacky X Zheng
(74) *Attorney, Agent, or Firm* — Chip Law Group

(57) ABSTRACT

An information processing device includes: a generation unit generating a sample image showing each of a first surface and a second surface that are next to each other of a label attachment target object having a plurality of surfaces, and a first image and a second image allocated to the first surface and the second surface, respectively, in association with each other; and a display processing unit performing control to display, on a display unit, a print setting screen for a printer printing a label, the print setting screen including the sample image.

7 Claims, 10 Drawing Sheets

INFORMATION PROCESSING DEVICE AND INFORMATION PROCESSING METHOD FOR CORRECTING ORIENTATION OF IMAGES

The present application is based on, and claims priority from JP Application Serial Number 2020-038525, filed Mar. 6, 2020, the disclosure of which is hereby incorporated by reference herein in its entirety.

BACKGROUND

1. Technical Field

The present disclosure relates to an information processing device, an information processing method, and a program.

2. Related Art

According to the related art, a printer printing a label to be attached to a solid object such as a box is known. JP-A-2012-88936 discloses a technique for causing a display of a print content by a printer to reflect a print color or a tape color.

In some cases, a label may be attached, extending over a plurality of surfaces of a solid object. Also, in some cases, the orientation of the label should be different from one surface to another. In such cases, according to the related-art technique, images in different orientations from one surface to another need to be combined together to prepare one image.

SUMMARY

An information processing device according to an aspect of the present disclosure for achieving the foregoing object includes: a generation unit generating a sample image showing each of a first surface and a second surface that are next to each other of a label attachment target object having a plurality of surfaces, and a first image and a second image allocated to the first surface and the second surface, respectively, in association with each other; and a display processing unit performing control to display, on a display unit, a print setting screen for a printer printing a label, the print setting screen including the sample image.

DESCRIPTION OF EXEMPLARY EMBODIMENTS

Embodiments of the present disclosure will now be described in the following order.
(1) Configuration of Label Generation System According to First Embodiment
(2) Label Generation Processing According to First Embodiment
(3) Second Embodiment
(4) Label Generation Processing According to Second Embodiment
(5) Third Embodiment
(6) Other Embodiments

(1) Configuration of Label Generation System According to First Embodiment

Figure 1:
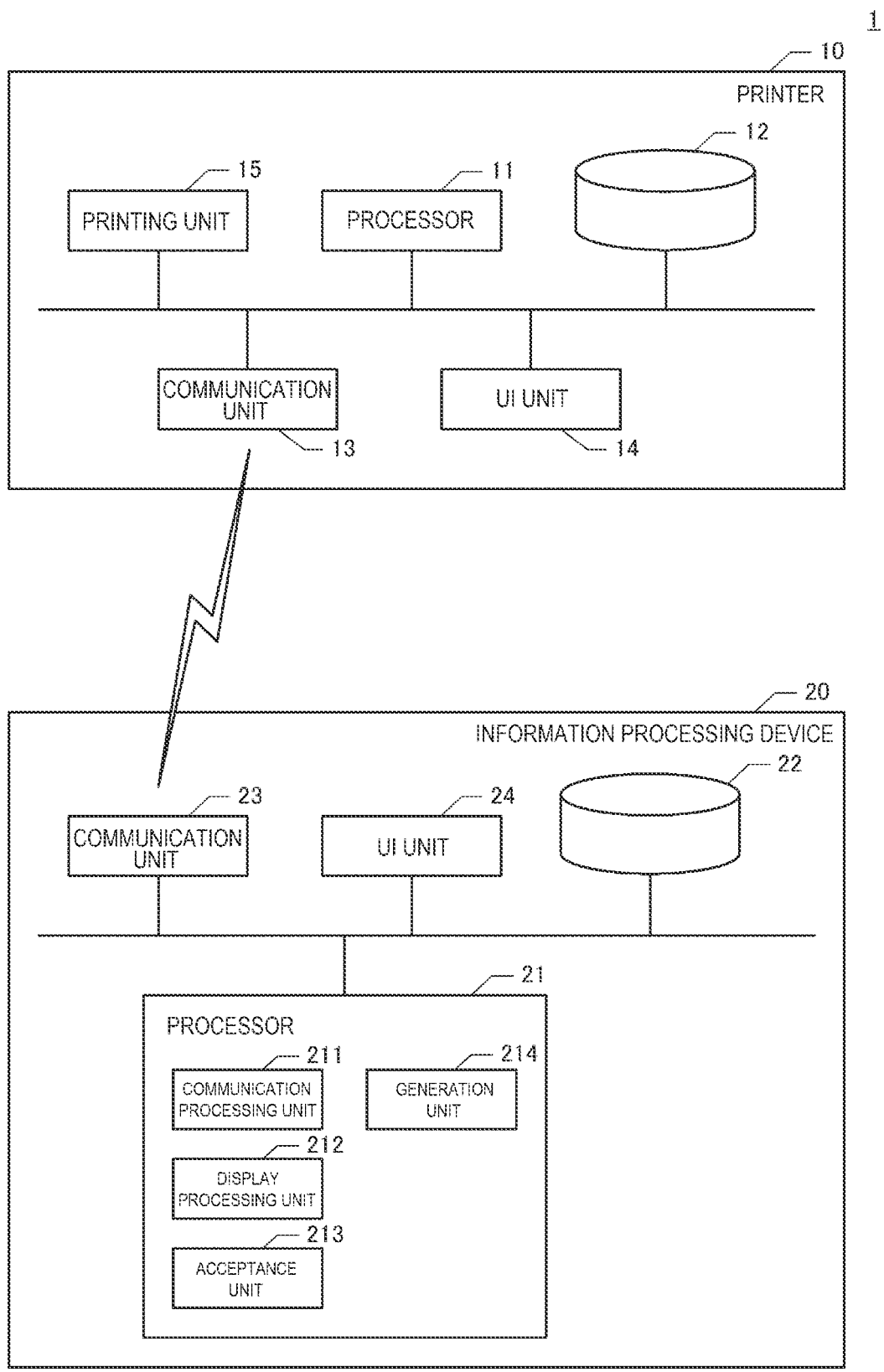
FIG. 1 shows the configuration of a label generation system.

FIG. 1 shows the overall configuration of a label generation system 1 according to a first embodiment. The label generation system 1 has a printer 10 and an information processing device 20. The printer 10 and the information processing device 20 are coupled in such a way as to be able to communicate with each other via a network. The information processing device 20 is equipped with a printer driver and instructs the printer 10 to print. The printer 10 prints a label according to an instruction from the information processing device 20. In this embodiment, it is assumed that a label printed by the printer 10 is attached, extending over two surfaces of a solid object having a plurality of surfaces. Hereinafter, the solid object to which a label is attached is referred to as a label attachment target object. In this embodiment, an example case where the label attachment target object is a rectangular parallelepiped is described.

Figure 2:
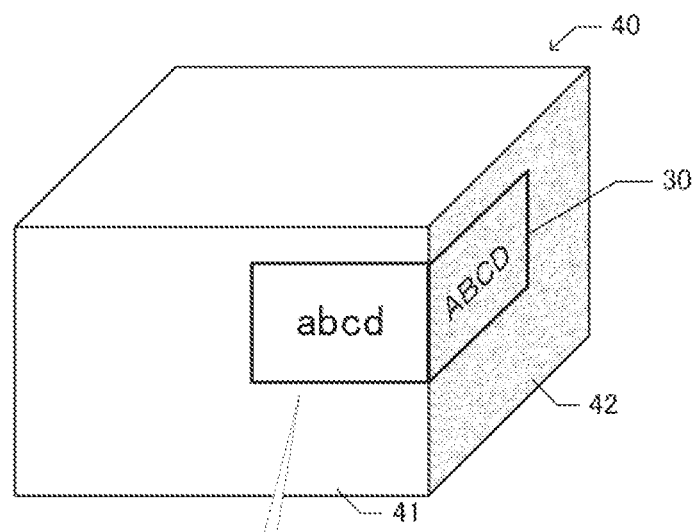
FIG. 2 shows a label and a label attachment target object.
Figure 2:
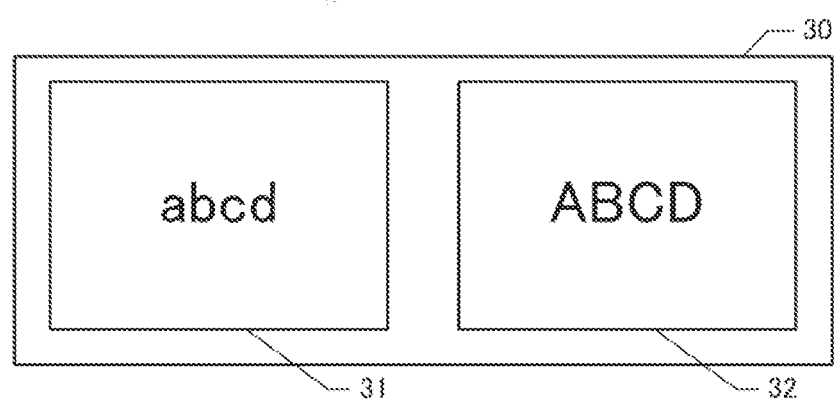

FIG. 2 shows an example of a label and a label attachment target object. As shown in FIG. 2, a label 30 is attached, extending over two surfaces that are next to each other of a label attachment target object 40 in the shape of a rectangular parallelepiped. In the example shown in FIG. 2, the label 30 is attached, extending over a first surface 41 and a second surface 42, which are side surfaces next to each other of the label attachment target object 40. In this embodiment, for the sake of convenience of the description, a long side of the label 30 is referred to as a horizontal side, and a short side is referred to as a vertical side. A first image 31 is arranged in an area attached to the first surface 41, of the label 30. A second image 32 is arranged in an area attached to the second surface 42, of the label 30. In this embodiment, it is assumed that the label 30 is a horizontally long rectangular print medium and that the first image 31 and the second image 32 arranged on the label 30, too, are horizontally long rectangular images.

Back to FIG. 1, the printer 10 has a processor 11, a non-volatile memory 12, a communication unit 13, a user interface (UI) unit 14, and a printing unit 15. The processor 11 has a CPU, a ROM, a RAM and the like, not illustrated. The processor 11 executes various programs stored in the non-volatile memory 12 and thus can control each part of the printer 10. The processor 11 may be formed of a single chip or a plurality of chips. Also, for example, an ASIC may be employed instead of the CPU. The processor 11 may also be configured of a CPU and an ASIC cooperating with each other.

The communication unit 13 includes a communication interface for communicating with an external device according to various wired or wireless communication protocols. The communication unit 13 also includes an interface for communicating with various removable memories installed in the printer 10. The printer 10 can communicate with the information processing device 20 via the communication unit 13.

The UI unit 14 includes a touch panel display and various keys, switches and the like. The touch panel display has a display panel displaying various kinds of information under the control of the processor 11 and a touch detection panel superimposed on the display panel, and detects a touch operation by a human finger or the like. The processor 11 can acquire the content of an operation by a user via the UI unit 14. The processor 11 can also display various kinds of information on the touch panel display of the UI unit 14 and thus notify the user.

The printing unit 15 executes printing on various print media, using various printing methods such as an inkjet method or an electrophotographic method. The printing unit 15 prints under the control of the processor 11 and according to a print job received from the information processing device 20. The printing unit 15 prints a label as described above.

The information processing device 20 has a processor 21, a non-volatile memory 22, a communication unit 23, and an UI unit 24. The processor 21 has a CPU, a ROM, a RAM and the like, not illustrated. The processor 21 executes various programs stored in the non-volatile memory 22 and thus can control each part of the information processing device 20. The processor 21 may be formed of a single chip or a plurality of chips. Also, for example, an ASIC may be employed instead of the CPU. The processor 21 may also be configured of a CPU and an ASIC cooperating with each other.

The communication unit 23 includes a communication interface for communicating with an external device according to various wired or wireless communication protocols. The information processing device 20 can communicate with the printer 10 via the communication unit 23.

The UI unit 24 includes a display unit, a keyboard, a mouse and the like. The processor 21 can acquire the content of an operation by a user via the UI unit 24. The processor 21 can also display various kinds of information on the display unit of the UI unit 24 and thus notify the user.

The processor 21 performs processing of controlling label printing by the printer 10. To this end, the processor 21 executes a printer driver, not illustrated, stored in the non-volatile memory 22. By executing the printer driver, the processor 21 functions as a communication processing unit 211, a display processing unit 212, an acceptance unit 213, and a generation unit 214.

The communication processing unit 211 is a function of performing control to transmit and receive information to and from the printer 10 via the communication unit 23. With the function of the communication processing unit 211, the processor 21 transmits, for example, print data for printing a label to the printer 10.

The display processing unit 212 is a function of displaying various kinds of information on the display of the UI unit 24. With the function of the display processing unit 212, the processor 21 performs control to display, for example, an imposition setting screen 400 shown in FIG. 3 and sample images shown in FIG. 4, on the display unit. Each screen will be described later.

The acceptance unit 213 is a function of accepting various instructions or the like via the UI unit 24. That is, with the function of the acceptance unit 213, the processor 21 accepts various instructions corresponding to user operations. The acceptance unit 213 also accepts a designation of an image allocated to each attachment surface of the label. The acceptance unit 213 also accepts a designation of an orientation of an image included in the label, a width of a margin between images included in the label, and the like. The orientation of an image is the correspondence between the label and the orientation of the image. In this embodiment, a direction from top to bottom set for an image is referred to as a downward direction. The downward direction in the label can be arbitrarily set. However, in this embodiment, the direction of the short side of the label 30 shown in FIG. 2 is defined as the downward direction. The image allocated to the attachment surface is a rectangular image. When appropriate, an image in which the downward direction is parallel to the long sides of the image is referred to a vertically long image, and an image in which the downward direction is parallel to the short sides of the image is referred to as a horizontally long image.

The generation unit 214 is a function of generating a sample image showing each of images allocated to a first surface and a second surface, respectively, and the first surface and the second surface, in association with each other. The processor 21 generates a sample image of a label according to an instruction accepted via the function of the acceptance unit 213. After an image is selected, the image may be adjusted from a vertically long image to a horizontally long image or from a horizontally long image to a vertically long image due to a change in the orientation of the image via the function of the acceptance unit 213. In this case, the processor 21 adjusts the size of the image, that is, reduces the size of the image so that the image fits within the area of the adjusted image. Specifically, the processor 21 reduces the image at a magnification of the short side of the image divided by the long side of the image. When an image has a blank and eliminating the blank enables the image to fit within the area of the adjusted image, the processor 21 may eliminate the blank in the image.

Figure 3:
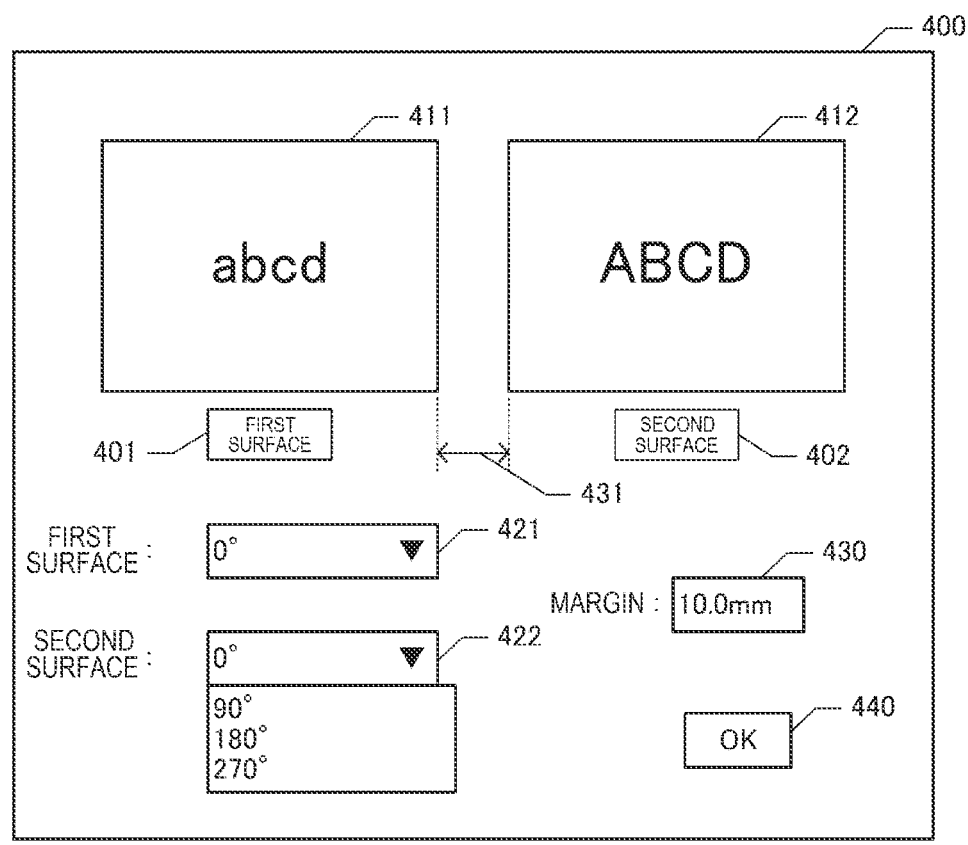
FIG. 3 shows an example of an imposition setting screen.

FIG. 3 shows an example of the imposition setting screen 400. The imposition setting screen 400 is a print setting screen displayed by the printer driver. When, with the function of the acceptance unit 213, a designation of an image allocated to each attachment surface of the label is accepted and an instruction to display the imposition setting screen 400 is also accepted, the processor 21 displays the imposition setting screen 400 on the display unit. In the imposition setting screen 400, a first image 411 allocated to a first surface in response to a user operation is displayed above a first surface icon 401 indicating the first surface of the label attachment target object. Also, a second image 412 allocated to a second surface in response to a user operation is displayed above a second surface icon 402 indicating the second surface of the label attachment target object. In this way, the processor 21 displays a sample image showing each of the first surface and the second surface of the label attachment target object, and the images allocated to the first surface and the second surface, respectively, in association with each other.

On the imposition setting screen 400, the user can check the orientation of the image on each attachment surface of the label. That is, the first image 411 and the second image 412 are displayed in an orientation in which these images are allocated to the label when the downward direction in the imposition setting screen 400 (downward direction in FIG. 3) is the downward direction in the label. As shown in FIG. 3, in the initial state of the imposition setting screen 400, the downward direction in the first image 411 and the second image 412 is set to be parallel to the up-down direction in the imposition setting screen 400.

The orientation of each of the images 411, 412 in the label can be changed in response to a user operation on the imposition setting screen 400. In the imposition setting screen 400, rotation menus 421, 422 for designating the rotation of the first image 411 and the second image 412 allocated to the first surface and the second surface, respectively, are displayed as well. The user can select an angle via the rotation menus 421, 422, thus rotate each image, and change the orientation of the image.

Figure 4:
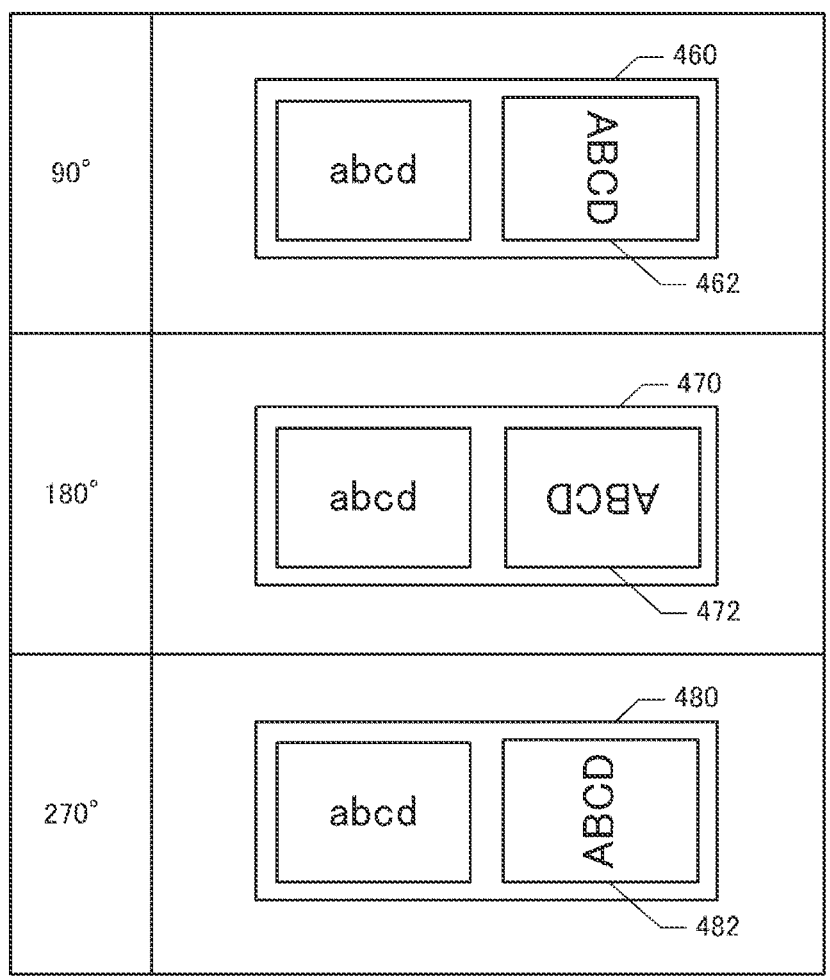
FIG. 4 explains orientations of an image.

For example, it is now assumed that a 90-degree clockwise rotation of the second image 412 is designated via the rotation menu 422 in the imposition setting screen 400. In this case, the processor 21 accepts a designation of an orientation of the second image 412. Then, with the function of the generation unit 214, the processor 21 rotates the second image 412 in a sample image 410 by 90 degrees, updates the second image 412 to a second image 462 including an image formed by reducing the second image 412 at a predetermined rate of reduction, and thus forms a sample image 460, as shown in FIG. 4. The predetermined rate of reduction is, for example, "the short side of the image divided by the long side of the image". Similarly, when a 180-degree rotation is designated, the processor 21 updates the second image 412 to a second image 472, which is the second image 412 rotated by 180 degrees, and thus forms a sample image 470, as shown in FIG. 4. When a 270-degree rotation is designated, the processor 21 rotates the second image 412 by 270 degrees, updates the second image 412 to a second image 482 reduced at a predetermined rate of reduction, and thus forms a sample image 480, as shown in FIG. 4. While the rotation of the second image is described here, the orientation of the first image 411 is similarly changed according to a designation via the rotation menu 421.

When the processor 21 accepts, for example, a designation of a 90-degree rotation, displays the sample image 460, and subsequently accepts a designation of a 180-degree rotation, the processor 21 rotates the second image 462 by 90 degrees and enlarges the second image at 1 divided by the predetermined rate of reduction. In this way, the processor 21 accepts a designation of an orientation of at least one of the two images included in the label. The processor 21 then generates a sample image including the image in the designated orientation.

Also, a margin setting area 430 is provided in the imposition setting screen 400. The user can input a width of a margin 431 between the first image 411 and the second image 412, in the margin setting area 430. In the initial state, it is assumed that a reference width, which is a predetermined margin width, is set.

Figure 5:
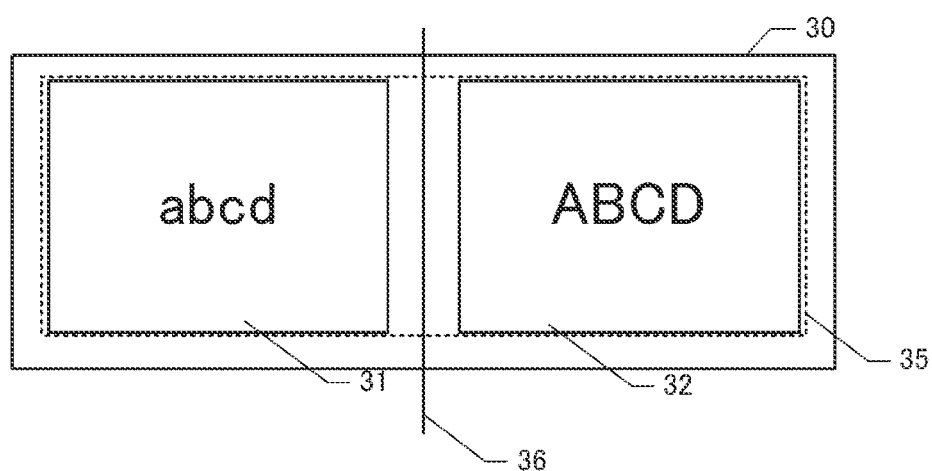
FIG. 5 explains processing of adjusting an image position and size according to the width of a margin.

The necessary margin varies depending on the curvature or the like of the curved surface at the boundary between two surfaces of the label attachment target object. The user can input a desired margin width according to the curvature or the like. When the user inputs a margin width, the processor 21 accepts the designation of the margin width with the function of the acceptance unit 213. Then, with the function of the generation unit 214, the processor 21 adjusts the size of the first image 411 and the second image 412 according to the margin width. The adjustment of the position and size of an image will now be described. FIG. 5 shows the label 30. In this embodiment, the two images 31, 32 are arranged in the label 30 and a reference width is set for a margin therebetween in the initial state. However, when the margin width is changed to a smaller value, the respective images 31, 32 are changed to such a position that the distance between a centerline 36 in the horizontal direction of the label 30 and the vertical side closer to the centerline 36 of each of the image 31, 32 is ½ of the designated margin width.

Meanwhile, when the margin width is changed to a larger value, each of the images 31, 32 is reduced at a magnification expressed by the following formula.

$$\{(\text{the length of the horizontal side of the image})-(\text{the amount of increase in the margin due to change})/2\}/(\text{the length of the horizontal side of the image}) \quad (1)$$

As described above, the information processing device 20 of the embodiment generates a sample image of a label showing each of a first surface and a second surface that are next to each other of a label attachment target object and a first image and a second image allocated to these surfaces, in association with each other. The information processing device 20 then displays a print setting screen including the sample image. This enables the user to easily imagine the state where an image included in a label is attached to a label attachment target object and to easily generate a label where an image is arranged in a desired orientation.

The information processing device 20 can also adjust the orientation of an image on the imposition setting screen. That is, the orientation of an image included in a label can be adjusted simply by giving an instruction to rotate the image in a sample image, without performing the work of generating an image of a label where an image is arranged in a desired orientation.

(2) Label Generation Processing According to First Embodiment

Figure 6:
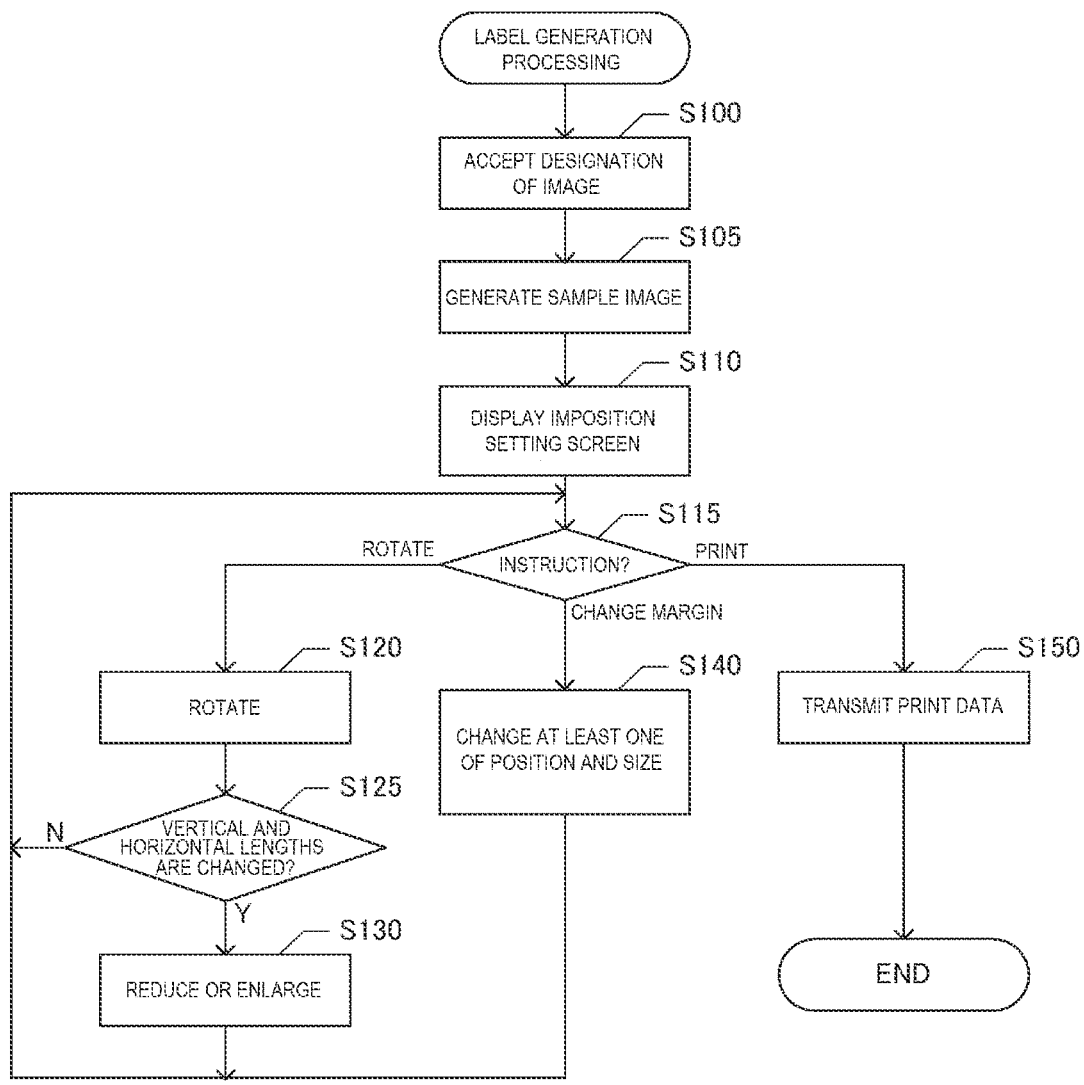
FIG. 6 is a flowchart showing label generation processing.

FIG. 6 is a flowchart showing label generation processing by the information processing device 20. In response to a user operation, the processor 21 of the information processing device 20 accepts a designation of an image to be displayed as a label via the function of the acceptance unit 213 (S100). Next, the processor 21 generates a sample image where a first image and a second image are allocated to a first surface and a second surface, respectively, via the function of the generation unit 214 (S105). Next, the processor 21 displays the imposition setting screen 400 including the sample image (S110).

Next, the processor 21 accepts a user operation. When the user gives an instruction to rotate the first image or the second image by the rotation menus 421, 422 in the imposition setting screen 400 and the processor 21 accepts the rotation instruction via the function of the acceptance unit 213 (rotate in step S115), the processor 21 rotates the image according to the instruction by the angle according to the instruction (S120). The processor 21 then determines whether the rotation changes the image from a vertically long image to a horizontally long image or from a horizontally long image to a vertically long image, or not. When the image changes from a vertically long image to a horizontally long image or from a horizontally long image to a vertically long image (Y in step S125), the processor 21 reduces or enlarges the image so that the image after the rotation is arranged within the area where the image before the rotation is arranged (S130). The processor 21 subsequently shifts the processing to step S115. Meanwhile, when the rotation does not change the image from a vertically long image to a horizontally long image or from a horizontally long image to a vertically long image (N in step S125), the processor 21 shifts the processing to step S115 without reducing or enlarging the image.

It is now assumed that a margin width is set in the margin setting area 430 in the imposition setting screen 400. In this case, the processor 21 accepts a margin change instruction via the function of the acceptance unit 213 (change margin in step S115) and changes at least one of the position and size of the image via the function of the generation unit 214 (S140).

When an OK button 440 is pressed in the imposition setting screen 400 and a print button, not illustrated, is pressed, the processor 21 accepts a print instruction via the function of the acceptance unit 213. On accepting the print instruction (print in step S115), the processor 21 generates print data of a label that is set in the imposition setting screen 400, and transmits the print data to the printer 10 via the communication unit 23 (S150). The label generation processing is thus completed.

(3) Second Embodiment

Figure 7:
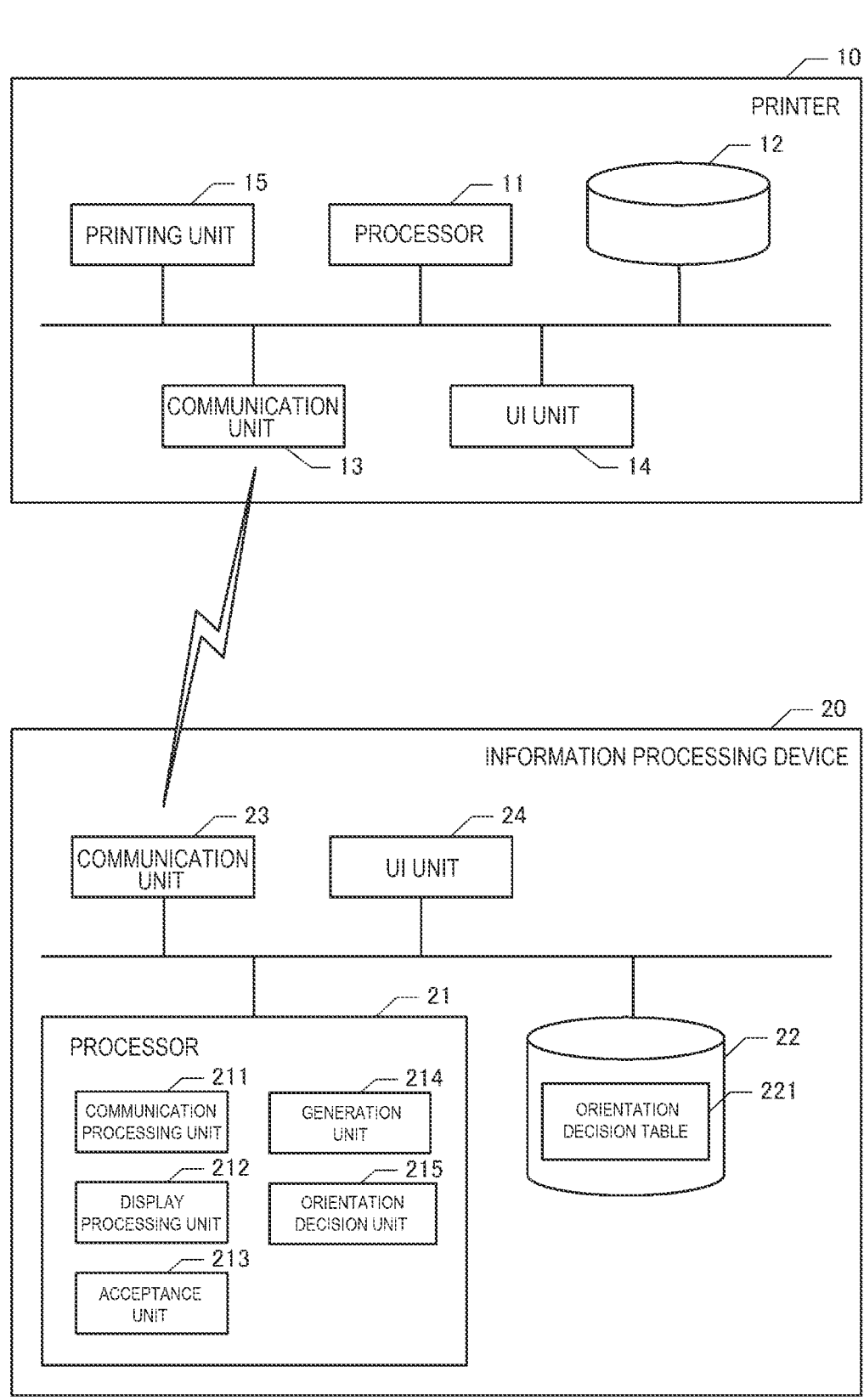
FIG. 7 shows the configuration of a label generation system according to a second embodiment.
Figure 8:
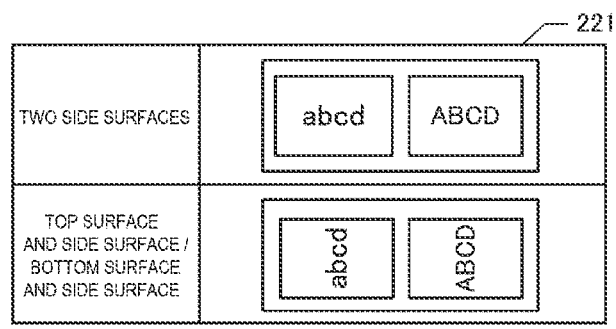
FIG. 8 shows the data configuration of an orientation decision table.

The label generation system 1 according to a second embodiment will now be described mainly in terms of its difference from the label generation system according to the first embodiment. FIG. 7 shows the overall configuration of the label generation system 1 according to the second embodiment. In the label generation system 1 according to the second embodiment, an orientation decision table 221 is stored in the non-volatile memory 22 of the information processing device 20. FIG. 8 schematically shows the data configuration of the orientation decision table 221. In the orientation decision table 221, two attachment surfaces of the label attachment target object and an orientation of a first image and a second image in the initial state are stored in association with each other.

In the example shown in FIG. 8, a combination of two side surfaces that are next to each other of the label attachment target object 40 is associated with an orientation such that the downward direction in both the first image and the second image coincides with the direction of the short side of the label. A combination of the top surface and a side surface or a combination of the bottom surface and a side surface is associated with an orientation such that the downward direction in the first image and the second image coincides with the direction of the long side of the label. For example, when two side surfaces are used as attachment surfaces, the label is attached in such a way that the long side of the label is perpendicular to the up-down direction in the label attachment target object 40 as shown in FIG. 2. Preferably, the downward direction in the image allocated to the label may coincide with the up-down direction in the label attachment target object 40. Thus, in this embodiment, the combination of two side surfaces is associated with an orientation of the image such that the downward direction in the label and the downward direction in the image coincide with each other.

Figure 9:
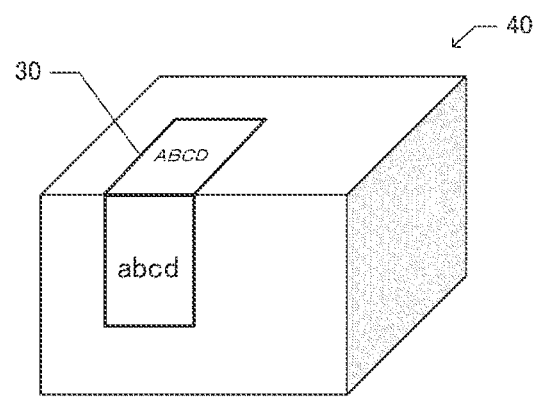
FIG. 9 explains a label and an orientation of an image.

When the top surface and a side surface are used, the label 30 is attached in such a way that the up-down direction in the side surface and the long side of the label are parallel to each other, and the label 30 is also attached to the top surface, as shown in FIG. 9. In this case, to make the downward direction in the image and the up-down direction in the label attachment target object coincide with each other, the downward direction in the image needs to coincide with the direction of the long side of the label. Thus, in this embodiment, the combination of the top surface and a side surface is associated with an orientation of the image such that the horizontal direction in the label and the downward direction in the image coincide with each other.

The acceptance unit 213 in the processor 21 of the information processing device 20 according to the second embodiment also accepts a designation of a first surface and a second surface to attach a label. The processor 21 also has the function of an orientation decision unit 215 in addition to the functions of the processor 21 according to the first embodiment. The orientation decision unit 215 is a function of deciding an orientation of a first image and a second image allocated to a label. When two attachment surfaces are designated in response to a user operation, the processor 21 decides an orientation of each image, based on the combination of the two designated attachment surfaces, that is, based on the positional relationship. Specifically, the processor 21 refers to the orientation decision table 221 and thus decides the orientation of the two images associated with the two attachment surfaces designated in response to the user operation, as the orientation of each image. The generation unit 214 generates a sample image showing each of the first image and the second image in the orientation decided by the orientation decision unit 215, and the first surface and the second surface, in association with each other.

Figure 10:
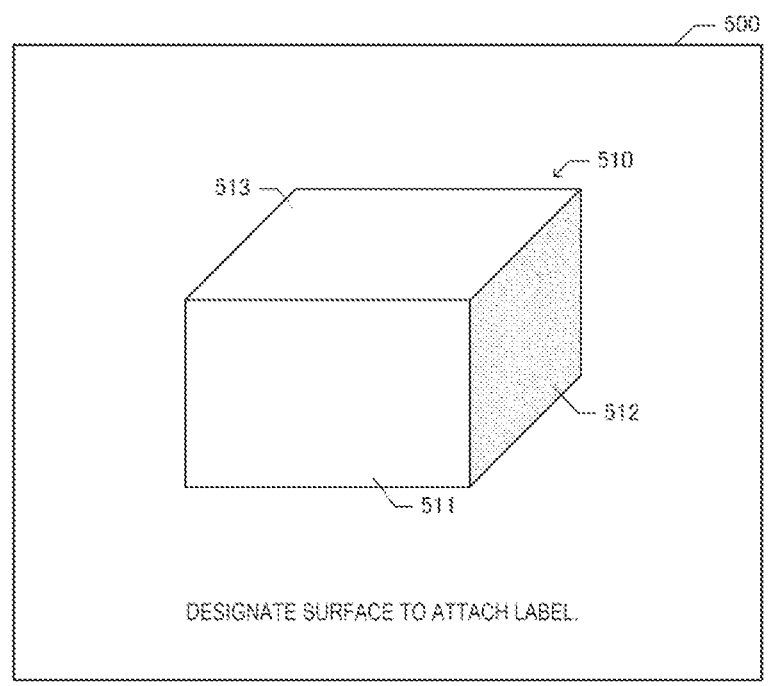
FIG. 10 shows an example of a surface designation screen.

FIG. 10 shows an example of a surface designation screen 500. The surface designation screen 500 is a screen for accepting a designation of a surface to attach a label. A user selects two surfaces that are next to each other from among six surfaces in total, that is, surfaces 511, 512, 513 and the other three surfaces, not illustrated, of a label attachment target object 510 shown in the surface designation screen 500. In response to this, the processor 21 accepts a designation of a first attachment surface and a second attachment surface to which a label is attached, via the function of the acceptance unit 213. The processor 21 can rotate the label attachment target object 510 shown in FIG. 10 in a virtual three-dimensional space in response to a user operation. This enables the other three surfaces not shown in FIG. 10 to be displayed on the display unit.

The processor 21 then decides an orientation of each of the first image allocated to the first surface and the second image allocated to the second surface, of the label, based on the positional relationship between the two attachment surfaces via the function of the orientation decision unit 215. For example, it is now assumed that the surface 511 and the surface 512 are selected as attachment surfaces in the surface designation screen 500 shown in FIG. 10. In this case, an orientation such that the downward direction in the image and the direction of the short side of the label coincide with each other is decided to be employed, based on the orientation decision table 221. In this way, in the orientation decision table 221, an orientation of the image allocated to each surface is set in advance for each combination of two attachment surfaces. This enables automatic decision of the orientation of the image when two attachment surfaces are designated.

As described above, in the label generation system 1 according to the second embodiment, when an attachment surface to attach a label is designated, the information processing device 20 can automatically adjusts the orientation of the image and display a sample image in the adjusted state.

(4) Label Generation Processing According to Second Embodiment

Figure 11:
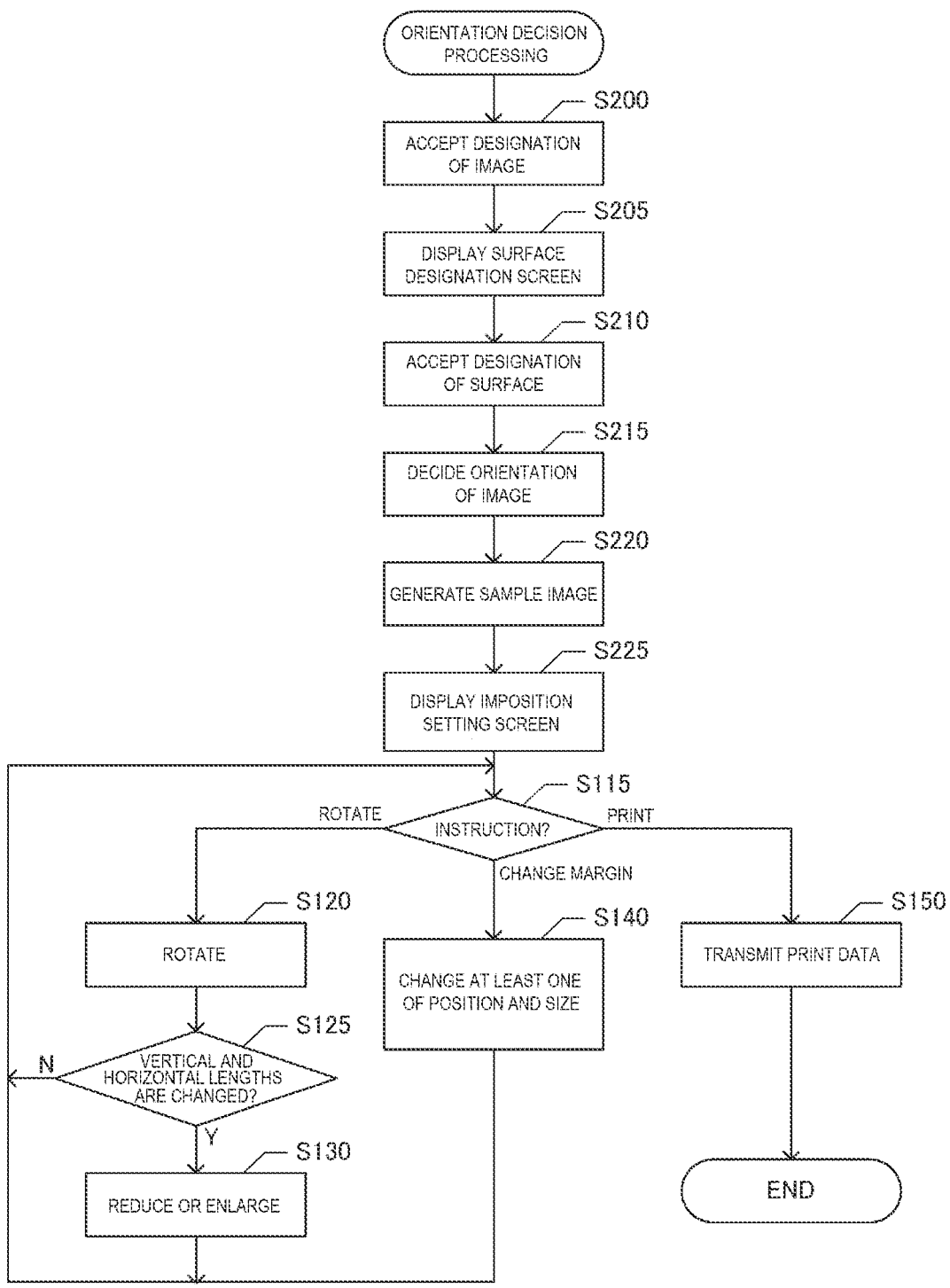
FIG. 11 is a flowchart showing label generation processing according to the second embodiment.

FIG. 11 is a flowchart showing label generation processing by the information processing device 20. In response to a user operation, the processor 21 of the information processing device 20 accepts a designation of an image to be displayed as a label, via the function of the acceptance unit 213 (S200). Next, the processor 21 displays the surface designation screen 500 via the function of the display processing unit 212 (S205). Next, the processor 21 accepts a designation of two attachment surfaces that are next to each other, via the function of the acceptance unit 213 (S210). The processor 21 then decides an orientation of the two images allocated to the respective attachment surfaces, based on the positional relationship between the two attachment surfaces accepted in step S210, via the function of the orientation decision unit 215 (S215).

Next, the processor 21 generates a sample image where the first image and the second image in the orientation decided in step S215 are allocated to the first surface and the second surface, respectively, via the function of the generation unit 214 (S220). At this point, when the image is adjusted to a horizontally long image to a vertically long image or from a vertically long image to a horizontally long image, the processor 21 reduces the image at a predetermined rate of reduction. The processor 21 then displays the imposition setting screen 400 including the sample image (S225). The processor 21 subsequently accepts a user operation (S115). The processing from step S115 onward is similar to the processing from step S115 onward in the first embodiment described with reference to FIG. 6.

(5) Third Embodiment

Figure 12:
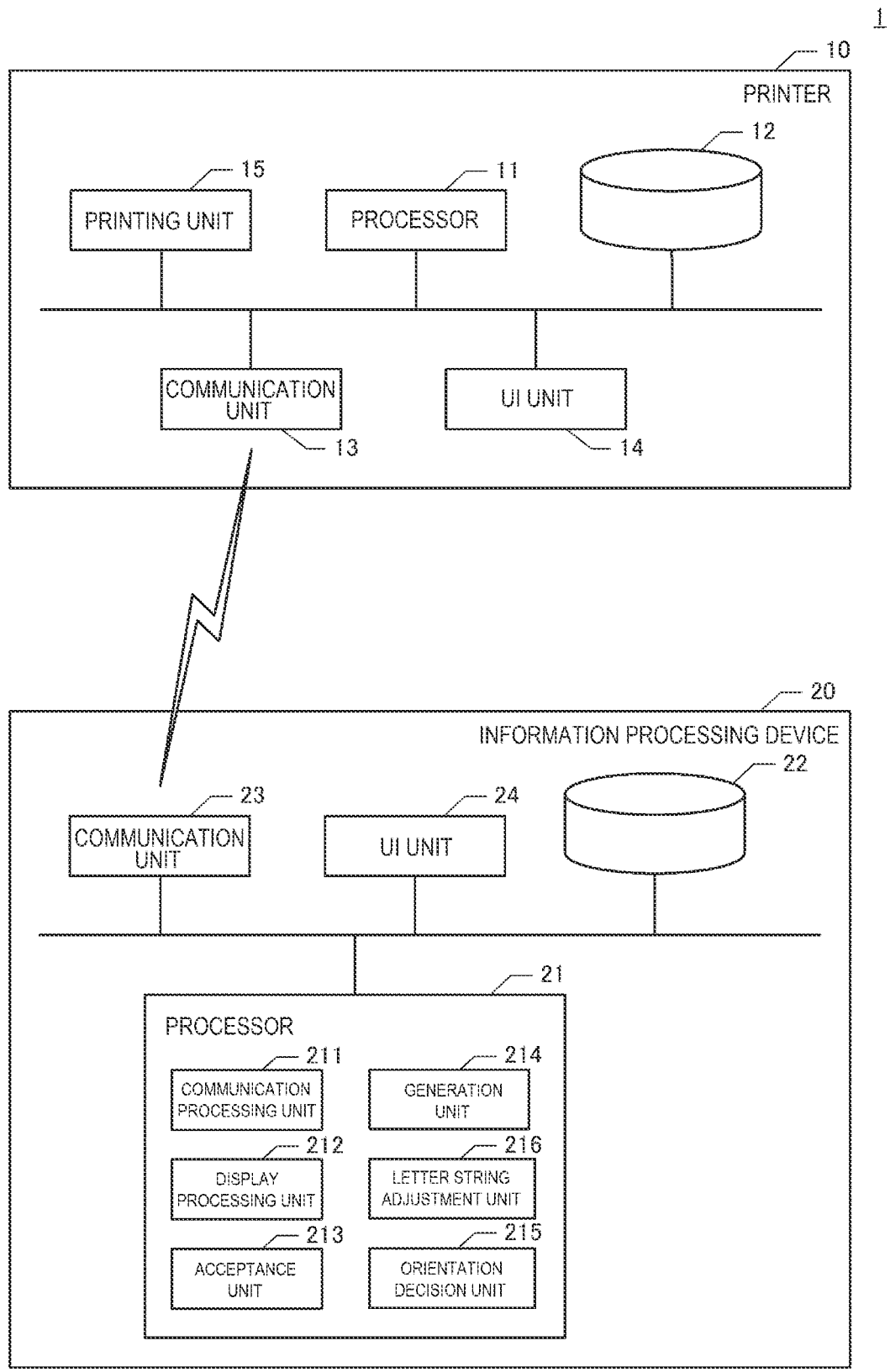
FIG. 12 shows the configuration of a label generation system according to a third embodiment.

A label generation system according to a third embodiment will now be described mainly in terms of its difference from the label generation system according to the first embodiment. FIG. 12 shows the overall configuration of the label generation system 1 according to the third embodiment. In the label generation system according to the third embodiment, the processor 21 of the information processing device 20 also functions as a letter string adjustment unit 216 in addition to the functions of the processor 21 in the first embodiment. In this embodiment, an image allocated to a label is an image acquired by drawing a code of a letter string of text data.

Figure 13:
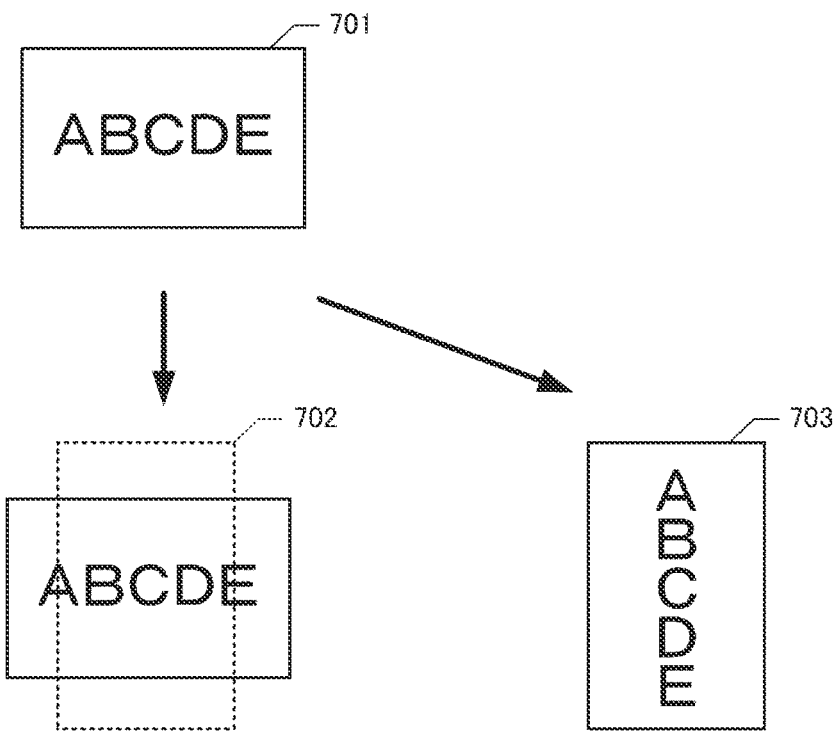
FIG. 13 explains letter string adjustment processing.

The letter string adjustment unit 216 is a function of deciding whether a letter string drawn in each image allocated to a label is vertically arranged or horizontally arranged. The processor 21 performs the following processing via the function of the letter string adjustment unit 216. For example, a case where a horizontally long image including a horizontally arranged letter string, like an image 701 shown in FIG. 13, is adjusted by rotation into a vertically long image like an image 702 and allocated to a label in this way, is considered. In this case, the letter string in the image 701 may not fit within the horizontal width of the image 702. Thus, when a horizontally long image including a horizontally arranged letter string is adjusted into a vertically long image, the processor 21 adjusts the direction of the letter string from horizontal to vertical as in an image 703. Similarly, when a vertically long image including a vertically arranged letter string is adjusted by rotation into a horizontally long image, the processor 21 adjusts the direction of the letter string from vertical to horizontal. Specifically, the processor 21 adjusts the orientation of the letter string and the direction of arrangement of the letter string in PostScript data of text data, that is, drawing data.

When changing the image allocated to the label from a horizontally long image to a vertically long image in step S130 in the label generation processing described with reference to FIG. 6, the processor 21 in this embodiment adjusts the letter string into a vertical arrangement instead of reducing the image. Meanwhile, when changing the image allocated to the label from a vertically long image to a horizontally long image in step S130, the processor 21 adjusts the letter string into a horizontal arrangement instead of reducing the image.

In this way, in the third embodiment, the processor 21 changes the direction of the letter string via the function of the letter string adjustment unit 216 but does not reduce the font size. Therefore, a drop in the visibility of the letter string can be prevented.

(6) Other Embodiments

The foregoing embodiments are examples for embodying the present disclosure. Various other embodiments can be employed. For example, the processor 11 of the printer 10 may have the functions of the processor 21 of the information processing device 20, and the processor 11 may adjust the orientation, position and size of the image allocated to the label and may display the sample image.

In the embodiments, the sample image is a planar image corresponding to the label. However, in another example, the information processing device 20 may display an image of the label in the state of being attached to the label attachment target object, as the sample image. This enables the user to check the orientation of the image in relation to the label attachment target object.

The label attachment target object may be any solid object having a plurality of surfaces and is not limited to an object in the shape of a rectangular parallelepiped. The label attachment target object may be, for example, a cube, cylinder or the like.

The recording medium on which the label is printed may be any recording medium that can be attached to the label attachment target object. The recording medium may be, for example, a recording paper, sticker paper, rolled paper or the like of a predetermined size. When a recording medium that is not coated with a pasting agent is used, the user may apply a pasting agent to attach the label to the label attachment target object.

In the embodiments, the label is attached to two continuous surfaces. However, the number of attachment surfaces is not limited to the number employed in the embodiment, and the label may be attached to a plurality of continuous surfaces. For example, when the label is attached to three continuous attachment surfaces, the information processing device 20 can adjust the orientation of each image allocated to each attachment surface.

In the embodiments, an example case where two images allocated to the label are different images is described. However, the two images allocated to the label may be the same images. In this case, too, the orientation of each image can be independently changed.

Figure 14:
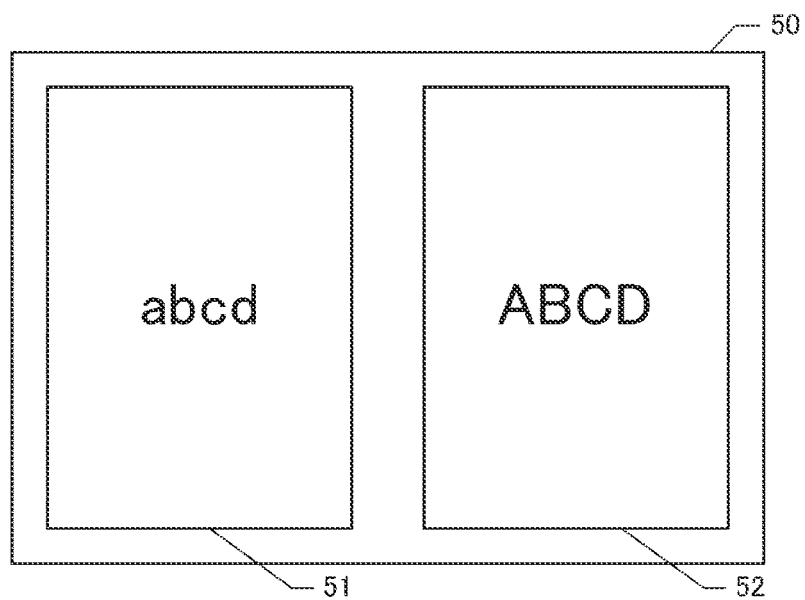
FIG. 14 shows a label according to another embodiment.

In the embodiments, an example case where a horizontally long image is allocated along the horizontal direction in the label is described. However, in another example, two vertically long images 51, 52 may be allocated along the horizontal direction in a label 50, as shown in FIG. 14.

The angle by which each image included in the label can be rotated is not limited to the angles described in the embodiments. In another example, the image may be rotatable by an arbitrary angle other than 0, 90, 180, and 270 degrees. This provides a label on which an image is printed at an angle as desired by the user.

The information processing device 20 may adjust at least one of the position and size of two images according to a designation of a margin width, and the specific processing for this is not limited to the processing described in the embodiments. When the image is provided with a blank, the blank may be trimmed to secure a margin width. In other words, the margin width may be set as including the width of the blank. For example, when the margin width is set to 10.0 mm and each of the two images is provided with a 5.00-mm blank, the margin width of 10.0 mm may be set as including this blank.

With respect to changing the margin, the information processing device 20 may accept information about the radius or the like of a curved surface between the two attachment surfaces of the label attachment target object from the user and may automatically calculate the margin width, based on the radius of the curved surface. For example, the information processing device 20 may find the circumference from the radius of the curved surface and may set the value of ¼ of the circumference as the margin width.

According to the present disclosure, the foregoing system can also be applied as a program executed by a computer or as a method. The system, program, and method may be implemented as a single device or by using a component provided in a plurality of devices, and include various aspects. Also, various suitable changes can be made, such as implementation in part by software and in part by hardware. Moreover, the foregoing technique may be implemented as a recording medium storing a program controlling the system. The recording medium storing the program may be a magnetic recording medium or semiconductor memory, and any recording medium to be developed in the future can similarly apply.

What is claimed is:

1. An information processing device comprising:
    circuitry configured to:
        generate a sample image showing each of a first surface and a second surface that are next to each other of a label attachment target object having a plurality of surfaces, and a first image and a second image allocated to the first surface and the second surface, respectively, in association with each other, wherein the label attachment target object is a rectangular parallelepiped;
        control display of a print setting screen for a printer printing a label, wherein the print setting screen includes the sample image;
        accept a designation of the first surface and the second surface from among six surfaces of the rectangular parallelepiped in response to a user operation;
        decide an orientation of the first image allocated to the first surface and the second image allocated to the second surface, based on a positional relationship between the first surface and the second surface that are designated; and
        generate the sample image where the first image and the second image are allocated in the decided orientation.

2. The information processing device according to claim 1, wherein
    the circuitry is further configured to control display of the rectangular parallelepiped, and
    accept the designation of the first surface and the second surface from among the six surfaces of the rectangular parallelepiped in response to the user operation to the rectangular parallelepiped that is displayed.

3. The information processing device according to claim 1, wherein
    at least one image of the first image and the second image is an image showing a letter string drawn from text data, and
    the circuitry is further configured to adjust drawing data of the image in such a way that the letter string of the text data is vertically arranged when the at least one image is a vertically long image, whereas the letter string of the text data is horizontally arranged when the at least one image is a horizontally long image.

4. The information processing device according to claim 1, wherein the circuitry is further configured to:
    accept a designation of a margin width between the first surface and the second surface; and
    change at least one of a position and a size of the first image and the second image allocated to the first surface and the second surface, according to the designation of the margin width.

5. The information processing device according to claim 4, wherein
    when at least one of the first image and the second image is provided with a blank, the circuitry is further configured to generate the sample image, assuming that the margin width whose designation is accepted includes the blank.

6. An information processing method executed by an information processing device, the method comprising:
    generating a sample image showing each of a first surface and a second surface that are next to each other of a label attachment target object having a plurality of surfaces, and a first image and a second image allocated to the first surface and the second surface, respectively, in association with each other, wherein the label attachment target object is a rectangular parallelepiped;
    controlling display of a print setting screen for a printer printing a label, wherein the print setting screen includes the sample image;
    accepting a designation of the first surface and the second surface from among six surfaces of the rectangular parallelepiped in response to a user operation;
    deciding an orientation of the first image allocated to the first surface and the second image allocated to the second surface, based on a positional relationship between the first surface and the second surface that are designated; and
    generating the sample image where the first image and the second image are allocated in the decided orientation.

7. A non-transitory computer-readable storage medium having stored thereon computer-executable instructions which, when executed by a computer, cause the computer to execute operations, the operations comprising:
    generating a sample image showing each of a first surface and a second surface that are next to each other of a label attachment target object having a plurality of surfaces, and a first image and a second image allocated to the first surface and the second surface, respectively, in association with each other, wherein the label attachment target object is a rectangular parallelepiped;
    controlling display of a print setting screen for a printer printing a label, wherein the print setting screen including the sample image;

accepting a designation of the first surface and the second surface from among six surfaces of the rectangular parallelepiped in response to a user operation;

deciding an orientation of the first image allocated to the first surface and the second image allocated to the second surface, based on a positional relationship between the first surface and the second surface that are designated; and generating the sample image where the first image and the second image are allocated in the decided orientation.

* * * * *